US007514701B2

(12) United States Patent
Chanzy

(10) Patent No.: US 7,514,701 B2
(45) Date of Patent: Apr. 7, 2009

(54) CONTAINER SHIELDING WALL WITH PUNCTURE-RESISTANT SHIELD AND CONTAINER COMPRISING AT LEAST ONE SUCH WALL

(75) Inventor: Yves Chanzy, Paris (FR)

(73) Assignee: Cogema Logistics, Montigny Le Bretonneux (FR)

( * ) Notice: Subject to any disclaimer, the term of this patent is extended or adjusted under 35 U.S.C. 154(b) by 654 days.

(21) Appl. No.: 10/503,864

(22) PCT Filed: Feb. 7, 2003

(86) PCT No.: PCT/FR03/00396

§ 371 (c)(1), (2), (4) Date: Apr. 5, 2005

(87) PCT Pub. No.: WO03/069633

PCT Pub. Date: Aug. 21, 2003

(65) Prior Publication Data

US 2005/0173432 A1 Aug. 11, 2005

(30) Foreign Application Priority Data

Feb. 11, 2002 (FR) .................................. 02 01621

(51) Int. Cl.
*G21F 5/00* (2006.01)
*H01J 1/52* (2006.01)
*B01J 19/00* (2006.01)
*B65D 1/40* (2006.01)

(52) U.S. Cl. .............. 250/507.1; 250/505.1; 250/506.1; 250/515.1; 250/517.1; 220/62.22; 422/198

(58) Field of Classification Search .............. 220/62.22; 422/198; 250/506.1, 505.1, 507.1, 515.1, 250/517.1

See application file for complete search history.

(56) References Cited

U.S. PATENT DOCUMENTS 3,669,299 A * 6/1972 Jones et al. .............. 220/592.2
3,813,281 A 5/1974 Burgess (Continued)

FOREIGN PATENT DOCUMENTS

FR 2790588 A1 * 9/2000
FR 2790589 A1 9/2000
FR 2804941 A1 8/2001
JP 10206591 A * 8/1998

OTHER PUBLICATIONS

Machine Translation of JP 10-206591.*
English Translation of FR 2790588 A1.*

*Primary Examiner*—Walter D Griffin
*Assistant Examiner*—Natasha Young
(74) *Attorney, Agent, or Firm*—Christensen O'Connor Johnson Kindness PLLC

(57) ABSTRACT

The invention relates to a shielding wall (12) with a puncture-resistant shield for a container (1), said wall (12) comprising support means (20) as well as the following respective stacked elements (24, 26, 28, 30, 32):
an outer plate (24);
a first dampening layer (26);
an intermediate plate (28);
a second dampening layer (30);
an inner plate (32).

According to the invention, the intermediate plate (28) is positioned non-rigidly with respect to the support means (20). The invention likewise relates to a container (1) comprising at least one shielding wall (12) such as the one described above.

Application to the field of transporting/storing nuclear materials.

20 Claims, 4 Drawing Sheets

U.S. PATENT DOCUMENTS 4,190,160 A 2/1980 Andersen
4,302,680 A * 11/1981 Ahner et al. ............. 250/506.1
4,330,711 A * 5/1982 Ahner et al. ............. 250/506.1
4,445,042 A * 4/1984 Baatz et al. .............. 250/506.1
6,489,623 B1 * 12/2002 Peters et al. ............. 250/506.1
2003/0015541 A1 1/2003 Mingot

* cited by examiner

CONTAINER SHIELDING WALL WITH PUNCTURE-RESISTANT SHIELD AND CONTAINER COMPRISING AT LEAST ONE SUCH WALL

TECHNICAL FIELD

This invention relates to the field of containers designed to transport/store sensitive materials, such as radioactive materials. More particularly, the invention relates to shielding walls with a puncture-resistant shield used to construct the side wall or walls, the bottom, and the removable cover or covers of such containers.

PRIOR ART

Conventionally, the containers for nuclear materials are substantially cylindrical or parallelepipedal in shape.

These containers usually consist of one or more side walls, a stationary bottom, a lid, and one or more removable protective covers, the latter being situated respectively at both ends of the container.

The side wall or walls, the bottom and the lid of the container form a safe containment situated inside the container, wherein the nuclear materials are safely placed.

The side wall or walls, the bottom, and the removable protective cover(s) of the container generally include a shielding wall created by a stacking of layers and plates each having at least one separate function, so that the container has certain characteristics allowing it to satisfy the prescribed safety requirements for the transport/storage of nuclear materials.

Among the trial runs to be undergone in order to satisfy these prescribed requirements, various tests are noted, such as those referred to as "free-fall" tests including, in particular, the fall onto a punch and the 9-metre fall, preceding the one referred to as the "fire" test.

In order to satisfy safety requirements, the layers and plates used to construct the shielding walls have been the subject of numerous studies, particularly in order to fulfil the specific requirements of the tests as concerns the fall onto a punch and the 9-metre free fall.

In actuality, this punch test consists in raising the container to one metre above a cylindrical punch measuring fifteen centimetres in diameter, then letting it fall by gravity onto the punch. In order to pass this test, the punch must not perforate the elements of the container forming the safe confinement.

It should also be pointed out that the shielding wall is designed to fulfil other functions such as the one related to puncture resistance. For illustrative purposes, in order that the container might satisfy the safety restrictions, the shielding wall must have thermal characteristics of the fire-resistant type, and/or energy absorption characteristics with respect to the 9-metre falls.

Thus, at the end of the free-fall tests, the shielding walls must still be able to protect the safe confinement, as well as all the components such as the seals, against excessively high temperatures encountered during the fire test, also referred to as a "burn test".

In the prior art, several walls of this type have already been proposed.

There are known shielding walls with a puncture-resistant shield comprising three elements stacked one on top of the other. In order to construct such walls, the elements are positioned such that an outer plate and an inner plate made of steel sandwich a fire-resistant layer, the latter being made of a material having a low crushing strength making it possible to absorb the fall energy.

However, when the punch test was carried out it was observed that the outer plate made of steel was perforated by punch, which no longer made it possible to keep the intermediate layer confined. Thus, with the fire resistance of the shielding wall becoming too critical, this solution was deemed unsatisfactory with regard to the prescribed requirements currently in effect.

In order to confront this problem, another type of shielding wall with a puncture-resistant shield was proposed, incorporating five elements stacked one on top of the other. This type of wall is further disclosed in FR-A-2 790 589.

First to be noted among these elements is a rigid outer plate made of steel, directly in contact with a dampening layer capable of absorbing the stresses caused by a punch. An intermediate plate made of steel or a composite material is placed under the dampening layer, and is in contact on its bottom side with a layer capable of deforming when compressed, having a low crushing strength and possibly having fire-resistant properties. Finally, the fifth and last element of the shielding wall consists of a rigid inner plate made of steel, having a high mechanical strength.

In this type of wall, the outer, intermediate and inner plates are each firmly fastened to support means.

However, when conducting tests using a punch, it was noted that the intermediate layer took up an insufficient amount of deformation energy, taking into account the weight/performance compromise to be satisfied.

Of the two prior art wall types just described, neither is capable of proposing a confinement plate for the fire-resistant layer offering resistance to the punch, and therefore of enabling the container to satisfy the prescribed criteria, in particular after the fire test. In order to solve this problem, for the two wall types described, it has thus been proposed to overdimension the plates incorporated into the shielding walls.

However, it turned out to be true that the dimensions that had to be applied to the plates in order to pass the punch test were not always compatible with the requirement to adhere to a maximum weight for the container, this weight limitation being imposed by the operating constraints.

Thus, the designers of such containers are therefore constantly confronted with a compromise between a total restricted weight for the various plates making up the wall, and a sufficient degree of mechanical strength for said wall, in order to pass all of the trial runs conducted during the prescribed safety tests relating to the transport/storage of nuclear materials.

DISCLOSURE OF THE INVENTION

First and foremost, the purpose of the invention is to introduce a shielding wall with a puncture-resistant shield for a container, said shielding wall at least partially eliminating the aforementioned disadvantages relating to the prior art.

More precisely, the purpose of the invention is to propose a shielding wall with a puncture-resistant shield for a container, said wall enabling the container to pass all of the prescribed safety tests for the transport/storage of nuclear materials, said tests possibly consisting of the punch test, the 9-metre fall test, or else the fire test.

Furthermore, the purpose of the invention is to propose a wall such that a container equipped with it might adhere to a weight limitation imposed by the operating constraints.

The invention likewise has the purpose of introducing a container comprising at least one shielding wall such as the one serving the purposes described above.

In order to accomplish this, the first and foremost object of the invention is a shielding wall with a puncture-resistant shield for a container, the wall comprising support means as well as the following respective stacked elements:

an outer plate;

a first dampening layer;

an intermediate plate;

a second dampening layer;

an inner plate.

According to the invention, the intermediate plate is positioned non-rigidly with respect to the support means.

Advantageously so, the intermediate plate in contact with the second dampening layer is not assembled together rigidly with the support means. This specific characteristic of the invention makes it possible to obtain a shielding wall with a puncture-resistant shield having a reduced weight and that is resistant to the punch test. As a matter of fact, after having passed through the outer plate and crushed the first dampening layer, the punch stresses the intermediate plate. During this stressing, with the intermediate plate being completely movable or held in place lightly relative to the support means, the force transmitted to the intermediate plate is distributed almost uniformly over a broad portion of the surface of said plate, thereby resulting in a displacement of said plate and a crushing of the second dampening layer over a very broad portion of the surface area of the latter.

Contrary to the walls of the prior art, in which the intermediate plate is embedded, the intermediate plate according to the invention is arranged so as to be made movable relative to the support means, under mechanical stresses produced by the force of the punch. Conversely, the embedding of the intermediate plate on the support means by welding, as was carried out in the embodiments of the prior art, leads to a stressing of the intermediate plate in very localized areas, which can cause the intermediate layer to be torn, and the confinement of the second dampening layer to be broken as well. This disadvantage from tearing is even greater when the second intermediate layer comprises a thermal protection function. As a matter of fact, in such a case, the second dampening layer no longer makes it possible to satisfactorily ensure protection of the safe containment against fire.

Moreover, the invention has all of the characteristics required to enable the container to satisfy the prescribed requirements, without having to overdimension the plates making up the shielding wall.

Finally, the shielding walls with a punch-resistant shield according to the invention provide a simple solution that is separate from the existing compromise of the prior art.

Preferably, the outer and inner plates of the wall are rigidly connected to the support means.

According to a first preferred embodiment of the invention, the intermediate plate rests on a plurality of shims spaced apart from one another and integral with the support means. Furthermore, provisions can also be made for the shims to be integral with side beams belonging to the support means, and for the intermediate plate to be connected to each shim by means of at least one frangible rivet.

According to a second preferred embodiment of the invention, the intermediate plate is held in place by the support means using at least one flexible tongue placed in between the support means and said intermediate layer.

According to a third preferred embodiment of the invention, the intermediate plate rests, on the one hand, against the first dampening layer and, on the other hand, against the second dampening layer, and is entirely free relative to the support means.

Another object of the invention is a container comprising at least one side wall, a bottom, and at least one removable cover. According to the invention, at least one element taken from the group consisting of each side wall, the bottom, and each removable cover of the container, comprises a shielding wall such as the one described above.

Other characteristics and advantages of the invention will become apparent from the detailed, non-limiting description below.

BRIEF DESCRIPTION OF THE DRAWINGS

This description will be provided in relation to the appended drawings wherein.

DETAILED DISCLOSURE OF PREFERRED EMBODIMENTS

Figure 1:
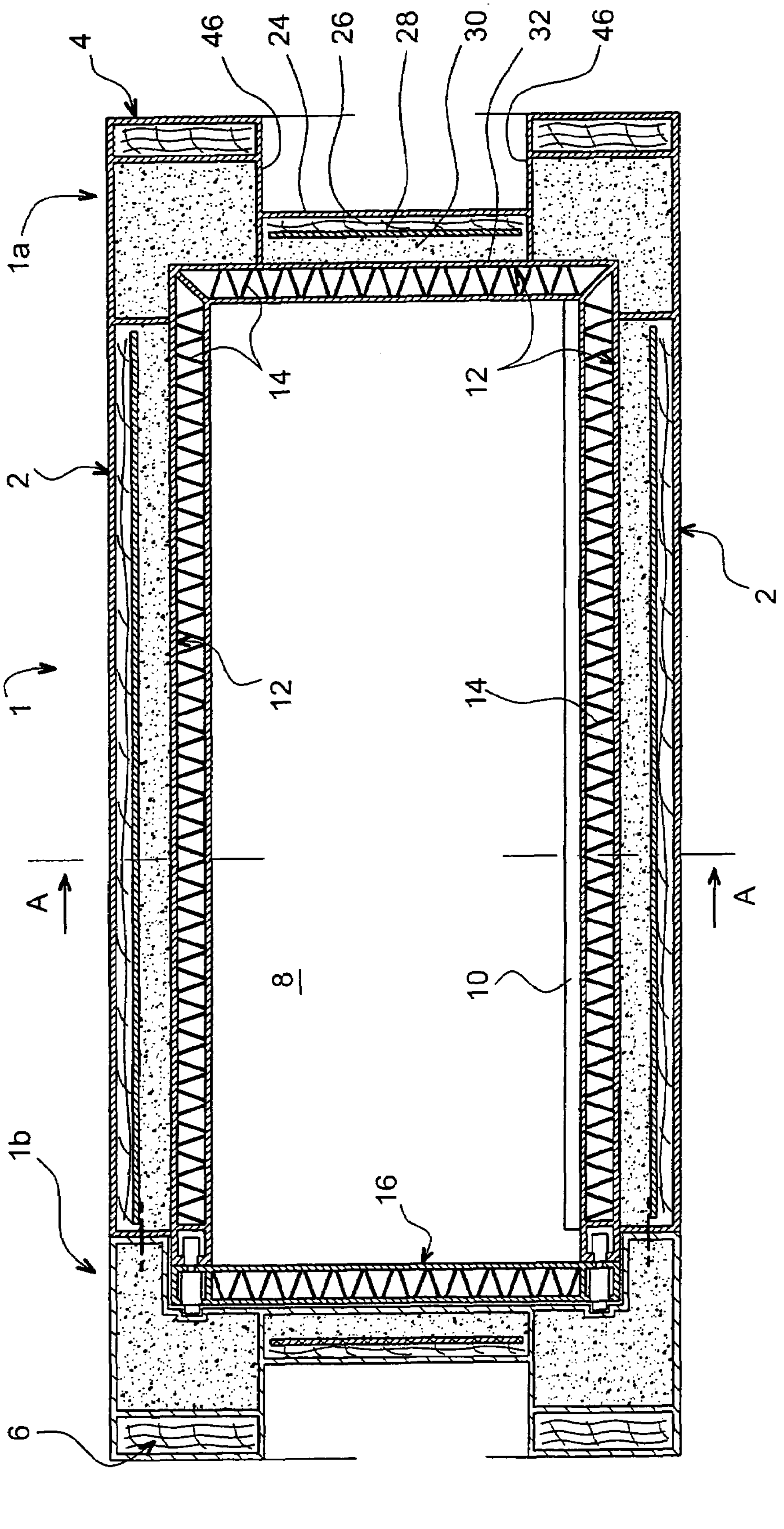
FIG. 1 shows a partial sectional view of a container including side walls comprising a shielding wall according to a first preferred embodiment of the invention, a bottom and a removable cover comprising a shielding wall according to a third preferred embodiment of the invention.
Figure 2:
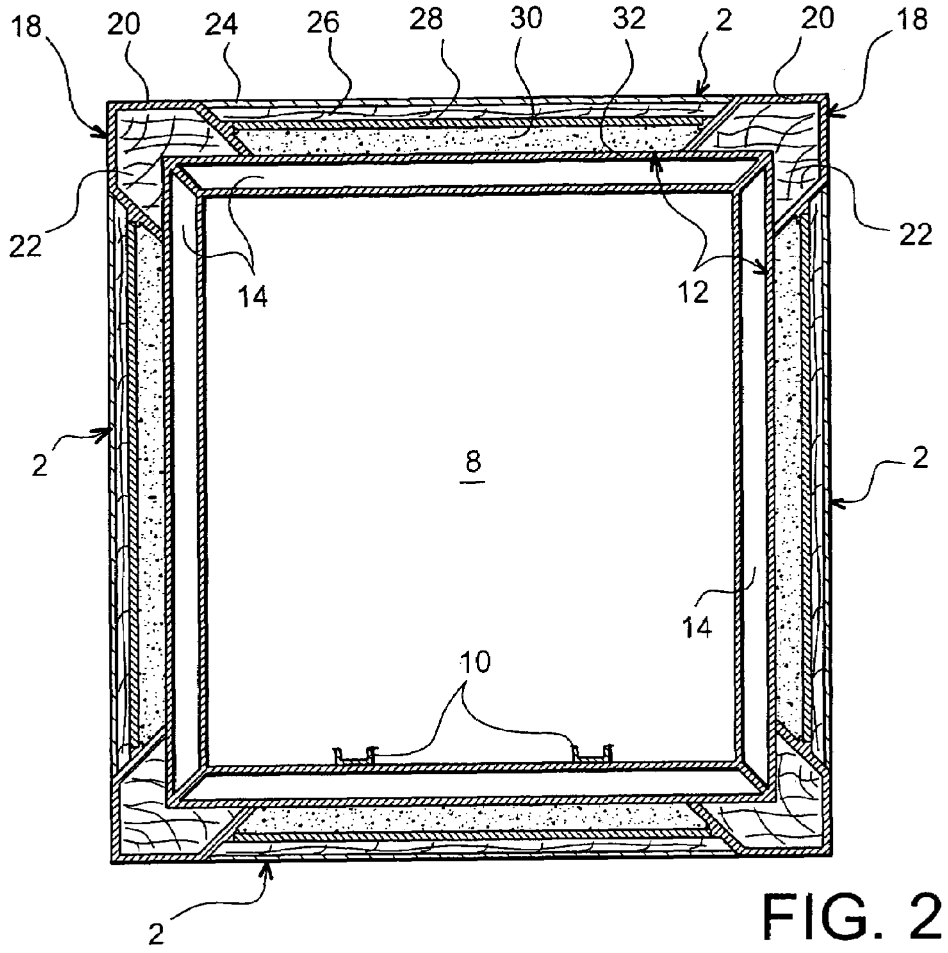
FIG. 2 shows a sectional view taken along line A-A of FIG. 1.

With reference to FIGS. 1 and 2, a container 1 is seen, which is designed to transport/store sensitive materials, and preferably nuclear materials.

Such a container 1, preferably having a substantially parallelepipedal shape, comprises four side walls 2, a bottom 4 fastened rigidly to the side walls 2 at a first end 1*a* of the container 1, a lid 16 and a removable cover 6 mounted on the side walls 2 at a second end 1*b* of the container 1.

The assembly of the container 1 components 2, 4, 16 produces a safe confinement 8 in which barrels (not shown) of nuclear materials can stand, which may be loaded into the safe confinement 8 by means of guide rails 10.

In the container 1 shown in FIGS. 1 and 2, the side walls 2, the bottom 4 and the removable cover 6 are equipped with a shielding wall 12 with a puncture-resistant shield having a substantially parallelepipedal shape, designed in particular to withstand the punch test carried out during the prescribed safety tests for the transport/storage of nuclear materials.

The shielding walls 12 each rest on a rigid lattice-like structure 14, said structures 14 also having the function of delimiting the safe confinement 8.

The shielding walls 12 are held in place on the container 1 by way of support means further comprising side beams 18. Each side beam 18, extending parallel to a longitudinal axis of the container 1, can be used for holding two shielding walls 12 belonging to two side walls 2 placed at 90° in relation to each other. These side beams 18 are preferably composed of one or more metal sheets 20 defining a space 22 filled with wood such as balsa.

As can be seen in FIG. 2, each shielding wall 12 with a puncture-resistant shield includes five elements stacked one on top of the other.

First to be noted among said elements is an outer plate 24, preferably made of metal and having a thickness of approximately 6 mm. This plate 24 constitutes the first element with which a punch enters into contact when a punch test is carried out.

A first dampening layer 26 is noted, which is placed directly beneath said outer plate 24. This first dampening layer 26 may consist of a material having a low crushing strength, and is designed to absorb a portion of the fall energy resulting from the punch test. For illustrative purposes, the first dampening layer 26, having a thickness of approximately 60 mm, consists of wood such as plywood or balsa, porous concrete, or phenolic foam. In the case where balsa is used, the primary direction of the fibres is preferably orthogonal to the longitudinal axis of the container 1.

The shielding wall 12 also comprises an intermediate plate 28, which may be made indifferently of high-yield-strength stainless steel or of a composite material. This intermediate plate 28 has a thickness of between 6 and 10 mm, the thickness varying as a function of the total weight of the container 1.

The intermediate plate 28 forms the outside portion of a confinement for a second dampening layer 30, having, in particular, a fire-resistant function. This second dampening layer 30, having a thickness of approximately 120 mm, preferably consists of phenolic foam. Moreover, this second dampening layer 30 may likewise consist of wood such as plywood or balsa, of which the primary direction of the fibres is the same as that of the balsa fibres forming the first dampening layer 26. It may be noted that, like the first dampening layer 26, the second dampening layer 30 may also consist of a material such as porous concrete, and will preferably not be as hard as the first dampening layer 26.

Finally, the last element of the shielding wall 12, likewise used to construct the lower portion of the confinement for the second dampening layer 30, is an inner plate 32 made of stainless steel, having a thickness ranging between approximately 6 and 8 mm.

It is to be specified that, in order to reduce the weight of the container 1, the inner plate 32 may be common to the shielding wall 12 and the lattice-like structure 14.

Taking as an example a shielding wall 12 for a side wall 2 of the container 1, it is appropriate to note that the outer plate 24 is fastened rigidly, preferably by welding, to the metal sheets 20 of the side beams 18 holding the shielding wall 12. In the same way, the inner plate 32 is fastened rigidly to the metal sheets 20 of these same side beams 18. In this way, the outer 24 and inner 32 plates are joined together rigidly by way of side beams 18 belonging to the support means of the shielding walls 12 on the container 1.

On the other hand, the intermediate plate 28 is positioned in a non-rigid manner relative to the metal sheets 20 of the side beams 18 and, consequently, is positioned non-rigidly relative to the support means.

Figure 3:
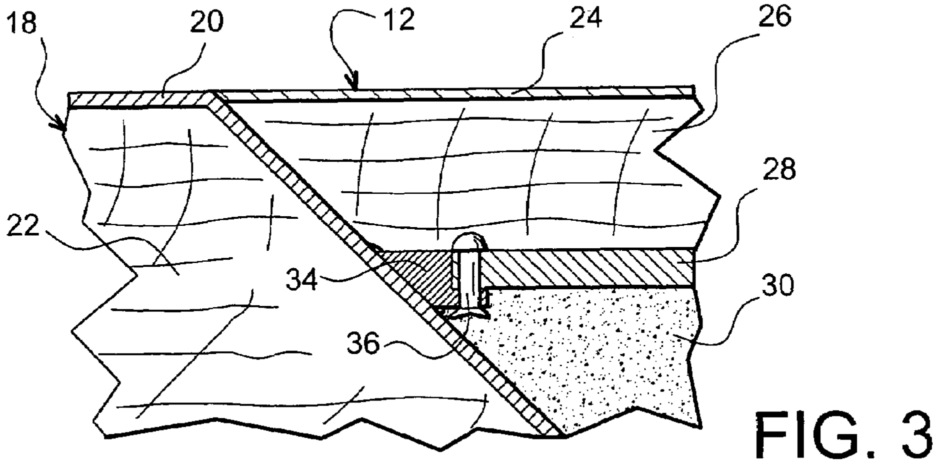
FIG. 3 shows a larger-scale partial view of FIG. 3.

According to a first preferred embodiment of the invention, and with reference to FIG. 3, a shielding wall 12 is seen, having a puncture-resistant shield comprising an intermediate plate 28 resting on a plurality of shims 34 spaced apart from each other and integral with the metal sheet 20 of the side beam 18. For illustrative purposes, the shims 34 may be assembled by welding them onto the metal sheet 20, or be obtained quite simply by deformation of said metal sheet 20.

The intermediate plate 28 is preferably connected to each shim 34 by means of at least one frangible rivet 36, more preferably a single rivet.

Figure 4:
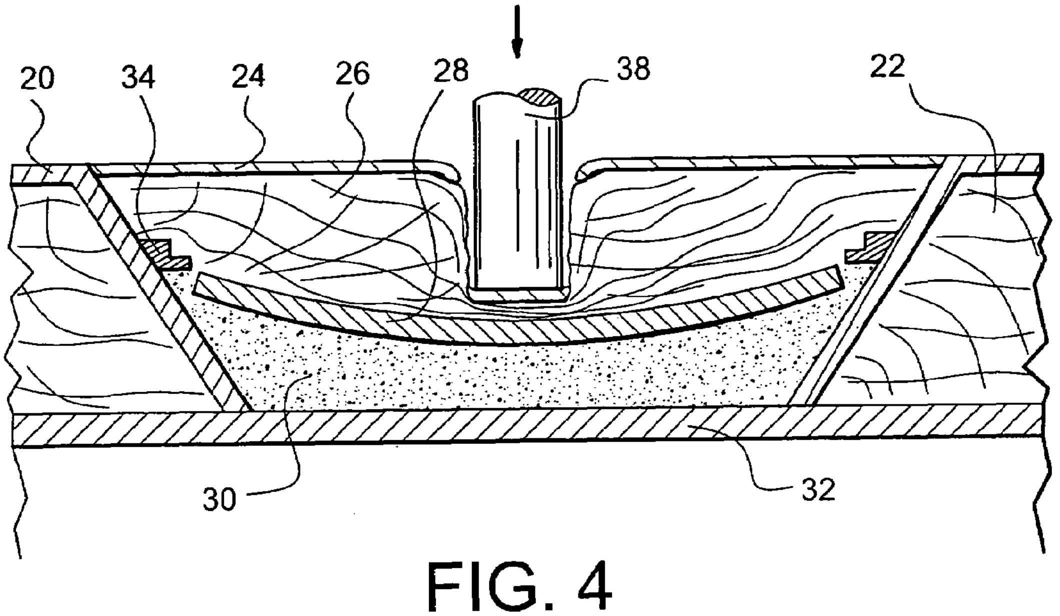
FIG. 4 shows a schematic sectional view of a wall according to the first preferred embodiment of the invention, after the punch test.

With reference to FIG. 4, the shielding wall 12 has just struck a punch 38, during the administration of a punch test in accordance with the one carried out within the framework of the prescribed safety tests for the transport/storage of nuclear materials.

The punch 38 first passes through the outer plate 24, then comes into contact with the first dampening layer 26, the latter absorbing a portion of the energy resulting from the fall onto the punch.

Next, the intermediate plate 28 is mechanically stressed by the punch 38. As mentioned above, the intermediate plate 28 is positioned non-rigidly relative to the metal sheet 20 of the side beam 18. The shims 34 and the rivets 36 provided for positioning the intermediate plate 28 then function solely as a mechanical fuse, and are arranged so that said intermediate plate 28 is released from the metal sheet 20 of the side beam 18, after an impact of the punch 38 against the shielding wall 12.

Thus, breaking the rivets 36 results in the edges of said plate 28 being rendered completely free or simply resting on the shims 34. The force of the punch 38 on the intermediate plate 28 then results in a slight curvature of said plate, then a movement of the intermediate plate 28 in a direction parallel to the longitudinal axis of the punch 38, towards the safe confinement 8.

Furthermore, the movement of the intermediate layer 28 causes the second dampening layer 30 to be crushed over a broad portion of its surface area, the intermediate plate 28 making it possible to distribute the forces over all of this large surface, which makes it possible to take up a maximum amount of the fall energy by compressing this second deformable dampening layer 30.

The movement of the intermediate plate 28, made possible by the crushing of the second dampening layer 30 and the non-rigid positioning of the intermediate plate 28 on the metal sheets 20, likewise makes it possible to prevent said plate 28 from being torn. On the other hand, it has been observed that the energy absorbed by the bending of the intermediate plate 28 was greater when it was free or simply resting on the support means, then when it was embedded in these means.

This then is a shielding wall 12 resistant to the punch test, capable of protecting the confinement of the second dampening layer 30, without having to proceed with an overdimensioning of the plates 24, 28, 30 making up the shielding wall 12. It should be noted also that by protecting the confinement of the second dampening layer 30, the latter likewise maintains its fire-resistant function when required.

Figure 5:
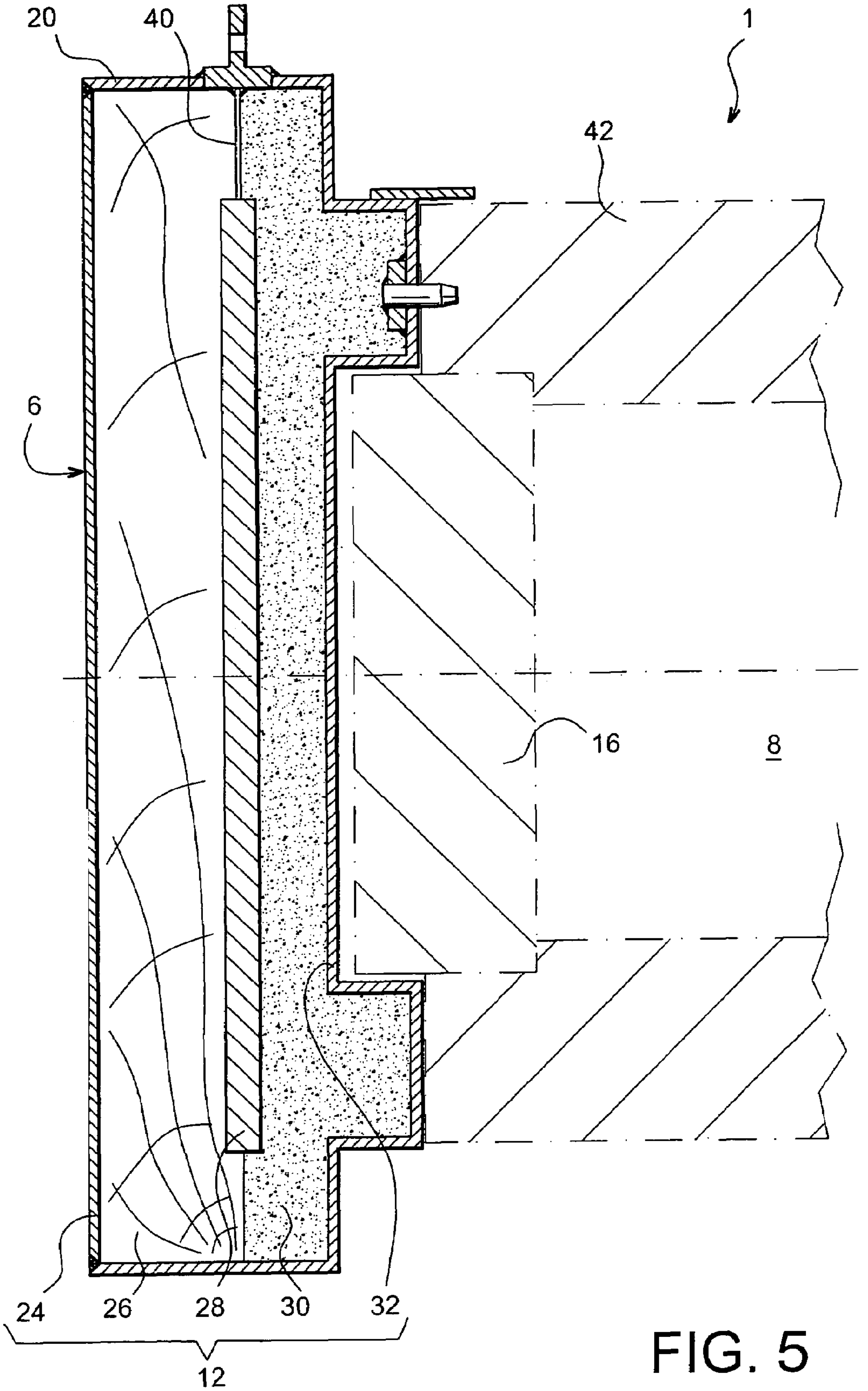
FIG. 5 shows a sectional view of a removable container cover comprising a shielding wall according to a second preferred embodiment of the invention.

According to a second preferred embodiment of the invention, with reference to FIG. 5, a container 1 is seen, having a substantially cylindrical shape, for which only the removable cover 6 is equipped with a shielding wall 12 with a puncture-resistant shield, likewise having a substantially cylindrical shape. As a matter of fact, in this case, the side wall 42 of the container 1 consists of a thick steel structure. The intermediate plate 28 is connected to a metal sheet 20 mating laterally with the wall 12, and corresponding to the support means of said wall. The connection between the intermediate plate 28 and the metal sheet 20 is established by means of at least one flexible tongue 40, said tongues 40 being welded on the one hand to the metal sheets 20, and on the other hand to the intermediate plate 28.

During the administration of a punch test, the intermediate plate 28 reacts in a manner analogous to the intermediate plate 28 of the first preferred embodiment of the invention, whose behavior following an impact by the punch 38 is shown in FIG. 4.

As a matter of fact, the stressing of the shielding wall 12 by the punch 38 brings about the bending and/or breaking of the flexible tongues 40 integral with the intermediate plate 28. This intermediate plate 28 thus bends slightly, then moves while crushing the fire-resistant layer 30 over a broad portion of its surface area.

According to a third preferred embodiment of the invention, with reference to FIG. 1 and more particularly to the bottom 4 of the container 1, a shielding wall 12 is seen whose outer 24 and inner 32 plates are integral with metal sheets 46 forming a frame around the shielding wall 12, and belonging to support means for said wall 12. It is clearly indicated that the removable cover 6 of the container 1 likewise comprises a wall according to the third preferred embodiment of the invention and similar to the wall 12 of the bottom 4, and will therefore not be described further.

In this third preferred embodiment of the invention, the intermediate layer 28 rests, on the one hand, against the first dampening layer 26 and, on the other hand, against the second dampening layer 30. Furthermore, no specific connection is provided between the metal sheets 46 and the intermediate plate 28, so that said intermediate plate 28 is completely free relative to the metal sheets 46.

Figure 6:
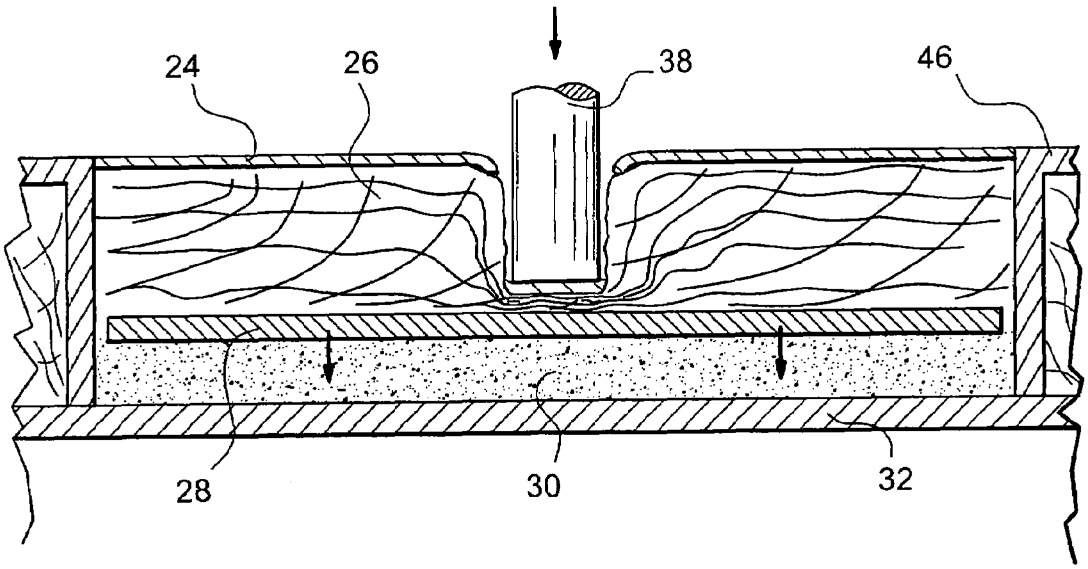
FIG. 6 shows a schematic sectional view of a wall according to the third preferred embodiment of the invention, after the punch test.

With reference to FIG. 6, during the administration of a punch test, the completely free intermediate plate 28 moves towards the safe confinement 8 while maintaining its substantially planar shape. Then, as in the preferred embodiments described above, the second dampening layer 30 is crushed, and the confinement of said layer 30 is preserved.

It may be noted that each of the three preferred forms of embodiment of the invention can be selected for the design of any one of the side walls 2, the bottom 4 or any one of the removable covers 6, of a container having a substantially parallelepipedal, cylindrical or other shape.

Of course, various modifications may be made, by one skilled in the art, to the shielding wall 12 with a puncture-resistant shield and to the container 1 that have just been described for purely illustrative, non-limiting purposes.

The invention claimed is:

1. Shielding wall with a puncture-resistant shield for a container, said shielding wall comprising support means as well as the following respective elements, stacked on top of each other:

an outer plate;
a first dampening layer;
an intermediate plate;
a second dampening layer;
an inner plate;
characterized in that the intermediate plate rests on a plurality of shims spaced apart from each other and integral with the support means and is arranged so as to be made movable relative to the support means, under mechanical stresses produced by the force of a punch, and in that the outer and inner plates are rigidly connected to the support means.

2. Shielding wall as claimed in claim 1, characterized in that the intermediate plate is connected to at least one of the plurality of shims by means of at least one frangible rivet.

3. Shielding wall with a puncture- resistance shield for a container, said shielding wall comprising support means as well as the following respect elements, stacked on top of each other:

an outer plate;
a first dampening layer;
an intermediate plate;
a second dampening layer;
an inner plate;
characterized in that the intermediate plate is held in place by support means by way of at least one flexible tongue placed in between the support means and said intermediate plate and is arranged so as to be made movable relative to the support means under mechanical stresses produced by the force of a punch, and in that the outer and the inner plates are rigidly connected to the support means.

4. Shielding wall as claimed in claim 1, characterized in that the intermediate plate rests against the first dampening layer, and against the second dampening layer.

5. Shielding wall as claimed in claim 1, characterized in that the outer plate is a metal plate.

6. Shielding wall as claimed in claim 1, characterized in that the first dampening layer is made of a material taken from the group consisting of wood, porous concrete, and phenolic foam.

7. Shielding wall as claimed in claim 1, characterized in that the intermediate plate is a stainless steel plate.

8. Shielding wall as claimed in claim 1, characterized in that the intermediate plate is a structure made of a composite material.

9. Shielding wall as claimed in claim 1, characterized in that the second dampening layer is made from a material taken from the group consisting of wood, porous concrete, and phenolic foam.

10. Shielding wall as claimed in claim 1, characterized in that the inner plate is a rigid metal plate.

11. Container comprising at least one side wall, a bottom and at least one removable cover, characterized in that at least one element taken from the group consisting of each side wall, the bottom and each removable cover of the container, comprises a shielding wall as claimed in claim 1.

12. Container as claimed in claim 11, characterized in that it is capable of transporting/storing nuclear materials.

13. Shielding wall as claimed in claim 3, characterized in that the intermediate plate rests against the first dampening layer against the second dampening layer.

14. Shielding wall as claimed in claim 3, characterized in that the outer plate is a metal plate.

15. Shielding wall as claimed in claim 3, characterized in that the first dampening layer is made of a material taken from the group consisting of wood, porous concrete, and phenolic foam.

16. Shielding wall as claimed in claim 3, characterized in that the intermediate plate is a structure made of a composite material.

17. Shielding wall as claimed in claim 3, characterized in that the second dampening layer is made from a material taken from the group consisting of wood, porous concrete, and phenolic foam.

18. Shielding wall as claimed in claim 3, characterized in that the inner plate Is a rigid metal plate.

19. Container comprising at least one side wall, a bottom and at least one removable cover, characterized in that at least one element taken from the group consisting of each side wall, the bottom, and each removable cover of the container, comprises a shielding wall as claimed in claim 3.

20. Container as claimed in claim 19, characterized in that it is capable of tran:portng/storing nuclear materials.

* * * * *

UNITED STATES PATENT AND TRADEMARK OFFICE

CERTIFICATE OF CORRECTION

PATENT NO. : 7,514,701 B2
APPLICATION NO. : 10/503864
DATED : April 7, 2009
INVENTOR(S) : Y. Chanzy It is certified that error appears in the above-identified patent and that said Letters Patent is hereby corrected as shown below:

| **COLUMN** | **LINE** | **ERROR** |
|---|---|---|
| 7<br>(Claim 3, | 66<br>line 3) | “respect” should read --respective-- |
| 8<br>(Claim 4, | 16<br>line 3) | after “layer” delete “,” |
| 8<br>(Claim 18, | 58<br>line 2) | “Is” should read --is-- |
| 8<br>(Claim 20, | 65<br>line 2) | “tran:portng/” should read<br>--transporting/-- |

Signed and Sealed this

First Day of December, 2009

David J. Kappos
*Director of the United States Patent and Trademark Office*